United States Patent [19]

Kumar

[11] Patent Number: 5,495,476
[45] Date of Patent: Feb. 27, 1996

[54] PARALLEL ALGORITHM TO SET UP BENES SWITCH; TRADING BANDWIDTH FOR SET UP TIME

[75] Inventor: Manoj Kumar, Yorktown Heights, N.Y.

[73] Assignee: International Business Machines Corporation, Armonk, N.Y.

[21] Appl. No.: 378,755

[22] Filed: Jan. 26, 1995

[51] Int. Cl.$^6$ ................................ H04Q 3/18; H04Q 3/32
[52] U.S. Cl. .............................. 370/54; 370/58.1; 370/60; 370/65.5; 340/825.8; 340/826
[58] Field of Search ........................... 370/54, 58.1, 58.2, 370/58.3, 59, 60, 60.1, 63, 64, 65.5; 340/825.8, 825.89, 825.79, 825.03, 826

[56] References Cited

U.S. PATENT DOCUMENTS

| | | | |
|---|---|---|---|
| 4,038,638 | 7/1977 | Hwang | 340/825.8 |
| 4,417,245 | 11/1983 | Melas et al. | 340/825.8 |
| 4,516,238 | 5/1985 | Huang et al. | 370/60 |
| 4,654,842 | 3/1987 | Coraluppi et al. | 370/58.1 |
| 4,696,000 | 9/1987 | Payne | 370/60 |
| 4,890,281 | 12/1989 | Balboni et al. | 370/60 |
| 4,989,022 | 1/1991 | Hwang | 340/825.8 |
| 5,018,129 | 5/1991 | Netravali et al. | 370/1 |
| 5,179,551 | 1/1993 | Turner | 370/60 |
| 5,229,317 | 3/1993 | Chen et al. | 395/325 |
| 5,229,990 | 7/1993 | Teraslinna | 370/60 |

OTHER PUBLICATIONS

"The GF parallel Computer" Parallel Computing 19 (1993) pp. 1393–1412 M Kumar et al (North Holland—Amsterdam).

"A Study of Non–Blocking Switching Networks" Bell System Tech. J. Mar. 1953 pp. 406–424 Charles Clos.

"Reswitching of Connection Networks" Bell System Tech. J. May 1962, pp. 833–855 M. C. Paull.

"A Permutation Network" J. of Assoc. for Computing Machinery, v. 15, #1 Jan. 1968 pp. 159–163 A. Waksman.

"A Fast Parallel Algorithm for Routing in Permutation Networks" IEEE Transactions on Computers v. C–30 #2 Feb. 1981 pp. 93–100 Freund et al.

"Parallel Algorithms to Set Up the Benes Permuation Network" IEEE Transactions on Computers v. C–31 #2 Feb. 1982 pp. 148–154 Nassimi et al.

"Decomposition of Permutation Networks" IEEE Transactions on Computers, v. C–22 #7 Jul. 1973 pp. 639–643 H. R. Rananujam.

*Primary Examiner*—Alpus Hsu
*Assistant Examiner*—Ricky Q. Ngo
*Attorney, Agent, or Firm*—Robert P. Tassinari, Jr.

[57] ABSTRACT

Benes networks are very effective in providing inter-processor communication in SIMD parallel machines, provided the communication patterns are compile-time determinable. These networks are ill suited when communication patterns are dynamically varying because of the long set up time requirements. The present invention is a method for handling dynamically varying communication patterns efficiently by operating the Benes network in a time division multiplexed manner, wherein during a given transmission period, the middle stage switches of the Benes network are configured as a portion of the middle stage switches of a Clos network configured to route all signals in a single period.

5 Claims, 4 Drawing Sheets

PARALLEL ALGORITHM TO SET UP BENES SWITCH; TRADING BANDWIDTH FOR SET UP TIME

FIELD OF THE INVENTION

The invention relates to switching networks.

BACKGROUND OF THE INVENTION

Benes networks are non blocking networks. That is, given any permutation between the N inputs and N outputs of the network, the switches of the network can be set to connect the inputs to the specified outputs. This property of the Benes networks makes them particularly attractive for inter-processor communication in SIMD machines. Because of the non-blocking nature of Benes networks, the communication latencies are always constant, and therefore communication over the network can be synchronized with the calculations being performed by the processors on an instruction by instruction basis. This results in very low hardware and software overhead in communication, and communication can be effectively overlapped with calculations.

Several algorithms are known for finding a switch setting for a Benes network so that a given permutation will be realized on the network. All these algorithms require several hundred thousand instructions to find the switch setting for one communication pattern in a 576×576 network. Therefore, to efficiently execute a program on a SIMD machine with a Benes network, the communication patterns used in the program must be identified either at compile time, or at least several hundred thousand cycles prior to their actual use during the execution of the program. If a large number of communication patterns get defined dynamically during the execution of a program, each of the communication patterns should be used several hundred thousand times to amortize the delay in calculating the switch setting for it.

While most applications, when programmed on SIMD machines, require only compile time identifiable communication patterns, some applications (such as those which employ adaptive grid refinement) fail to meet this criterion. In these applications the communication patterns are defined during the execution of a program shortly before their use, and they are used relatively few times. To execute such programs efficiently on a SIMD machine with a Benes network, it is important to have a method for finding the switch settings in a much shorter time.

Thus, Benes networks are very effective in providing inter-processor communication in SIMD parallel machines, provided the communication patterns are compile-time determinable. These networks are ill suited when communication patterns are dynamically varying, however, because of the long set up time requirements. The present invention is a method for efficiently handling dynamically-varying communication patterns.

SUMMARY OF THE INVENTION

The present invention provides an approach to solve the above problem by simulating a Clos network over the Benes network. Simulating one pass of the Clos network will require two passes or transfers over a Benes network, or alternatively the use of two copies of a Benes network. The effective bandwidth of the network is reduced by a factor of two in this approach, but the reduction in setup time can be two to three orders of magnitude. While one preferred embodiment of the invention deals with only three stage Benes (and Clos) networks, it will be understood that the invention can be extended easily to networks with more stages.

The above mentioned reduction in setup time is possible because of two factors. First, the Clos networks are strictly non-blocking, while Benes networks are "rearrangeable" non-blocking. That is, in a Clos network an unused input can be connected to any unused output without changing the already established connections, while making a new connection in a Benes network may require rerouting the previously established connections. Therefore, the setup algorithms for a Clos network are significantly simpler and less time consuming than that of a Benes network. Secondly, the algorithm for setting up a Clos network can be implemented very efficiently on a SIMD parallel computer which uses Benes networks, while the algorithm for setting up a Benes network can not be implemented in an efficient manner on such machines because they induce data-dependent dynamically varying communication patterns.

In one aspect of the invention, there is provided a method for routing signals through a Benes network, the network having first, middle and last stages of cells, comprising:

determining a Clos configuration setup foxy the switches of a Clos network for routing the signals through the Clos network, the Clos network having first, middle and last stages of switches;

choosing a first Benes configuration for the switches of the middle stage of the Benes network to be the same as the Clos configuration of the switches in a first half of the middle stage of the Clos network, and choosing a second Benes configuration for the switches of the middle stage of the Benes network to be the same as the Clos configuration of the switches in a second half of the middle stage of the Clos network;

operating the Benes network in a two way time division multiplexed manner using the first Benes configuration to send a first portion of the signals during a first period and using the second Benes configuration to send a second portion of the signals during a second period.

FIGURES

DETAILED DESCRIPTION

Simulating a Clos network on a Benes network

Figure 1:
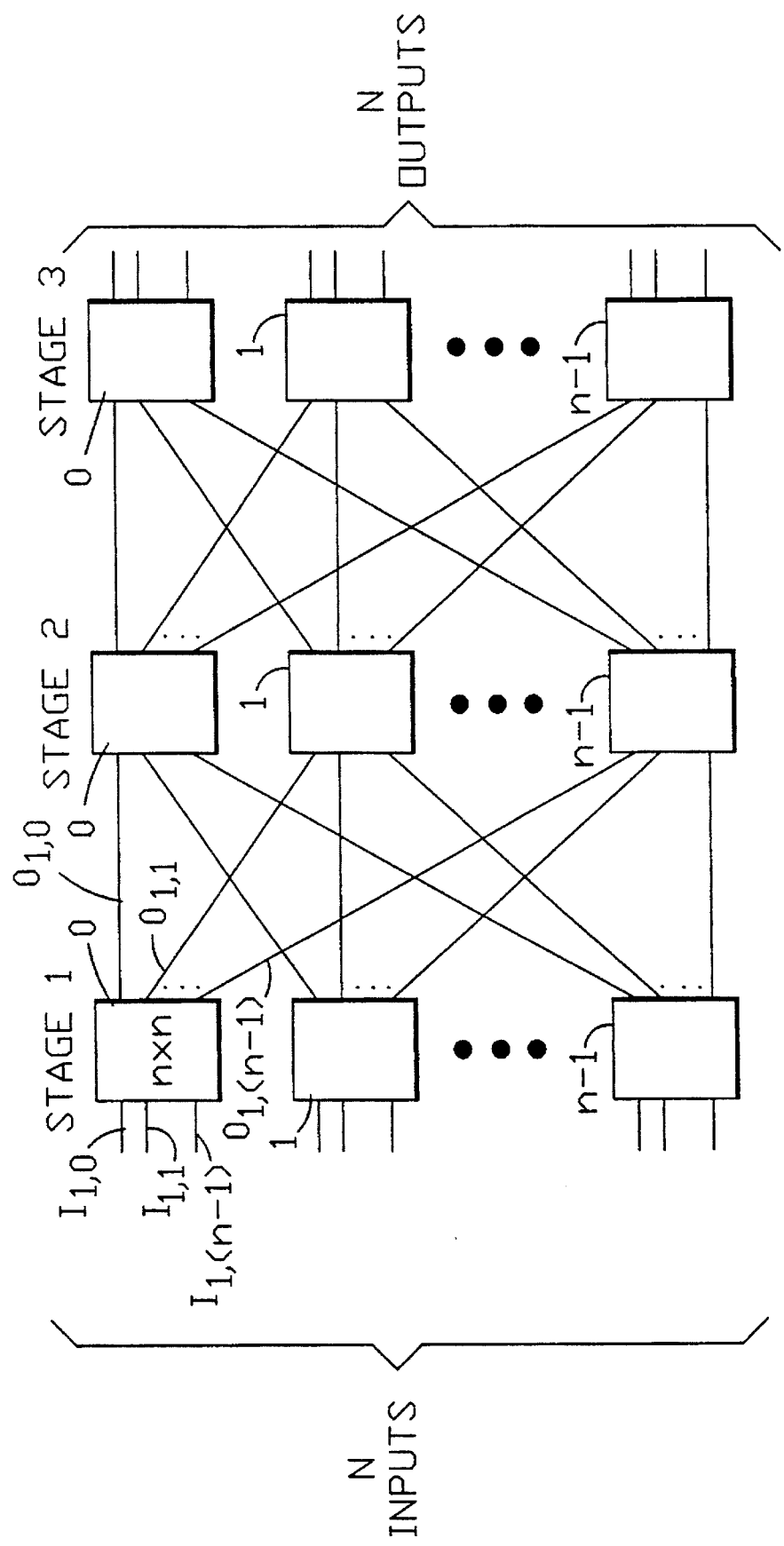
FIG. 1 is an N×N Benes network.
Figure 2:
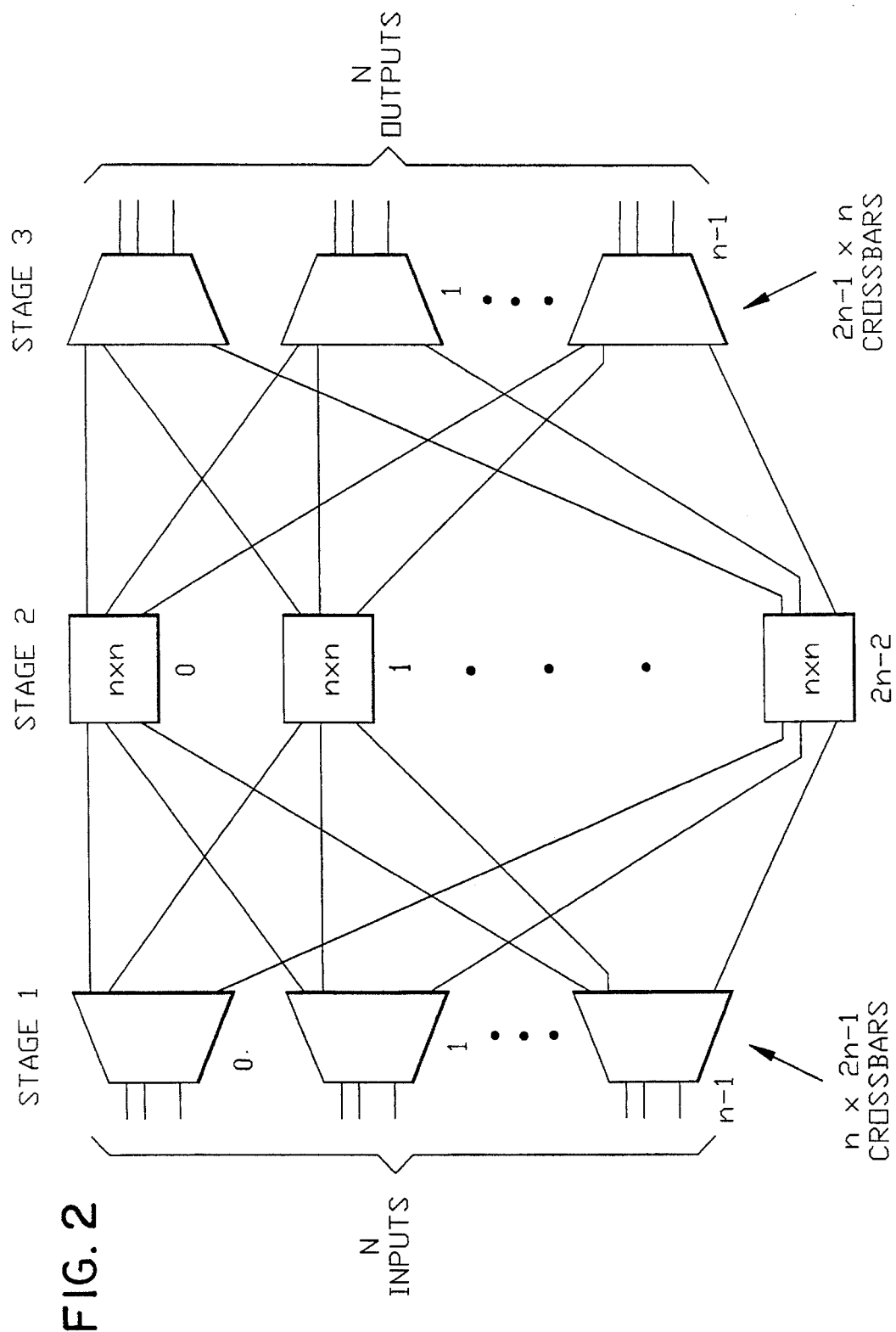
FIG. 2 is an N×N Clos network.

FIG. 1 shows an N×N Benes network constructed from $\sqrt{N}\times\sqrt{N}$ crossbar switches. It has three stages with n switches in each stage where $n=\sqrt{N}$. FIG. 2 shows an N×N Clos network which has n switches in the first stage which are n input 2n−1 output crossbars. The inputs of stage 1, switch 0 are labeled $I_{1,0}, I_{1,1}, \ldots I_{1,(n-1)}$, and outputs are labeled $O_{1,0}, O_{1,1}$ and $O_{1,(n-1)}$. The middle stage consists of 2n−1 switches which are n input n output crossbars, and stage 3 consists of n switches which are 2n−1 input n output crossbars. Again $n=\sqrt{N}$.

It can be seen that deleting the last n–1 middle stage switches and their connections to the first and third stage switches from the Clos network of FIG. 2 yields the Benes network of FIG. 1 with the same number of inputs and outputs. Similarly, deleting the first n switches from the middle stage of the Clos network also yields a Benes network.

Figure 3:
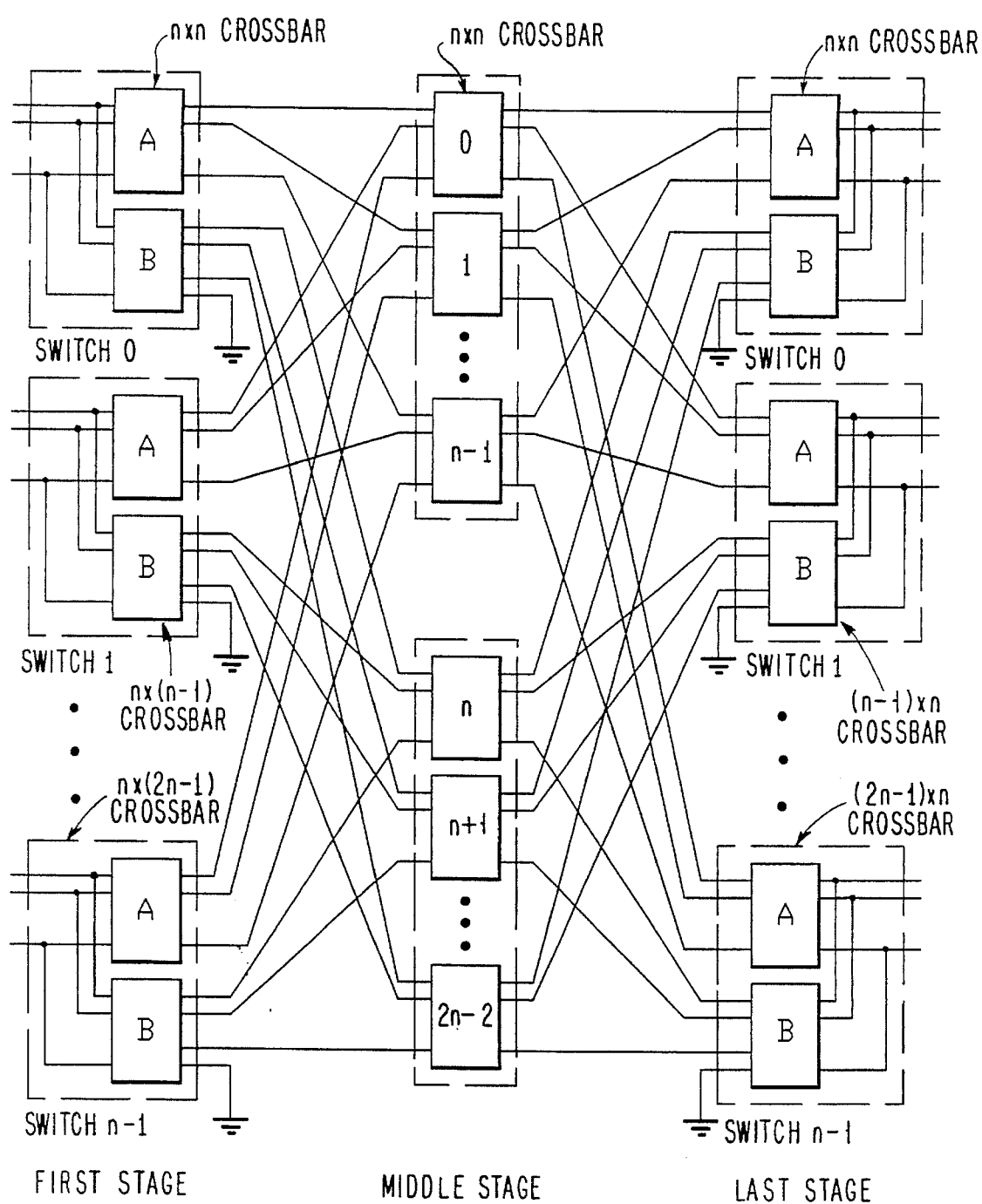
FIG. 3 shows the Clos network of FIG. 2 redrawn to show one implementation of the n×(2n−1) switches in the first stage and (2n−1)×n switches in the last stage.

In FIG. 3, the Clos network of FIG. 2 has been redrawn to show one possible implementation of the n×(2n–1) switches in the first stage and the (2n–1)×n switches in the last stage. The n×(2n–1) switches in the first stage are implemented as two smaller crossbars A and B of size n×n and n×n–1, respectively, with the n inputs of both A and B connected together as common inputs. Similarly, the n switches in the last stage are implemented as two smaller crossbars A & B of size n×n and n–1×n, respectively, with the n outputs of both A and B connected together.

Figure 4:
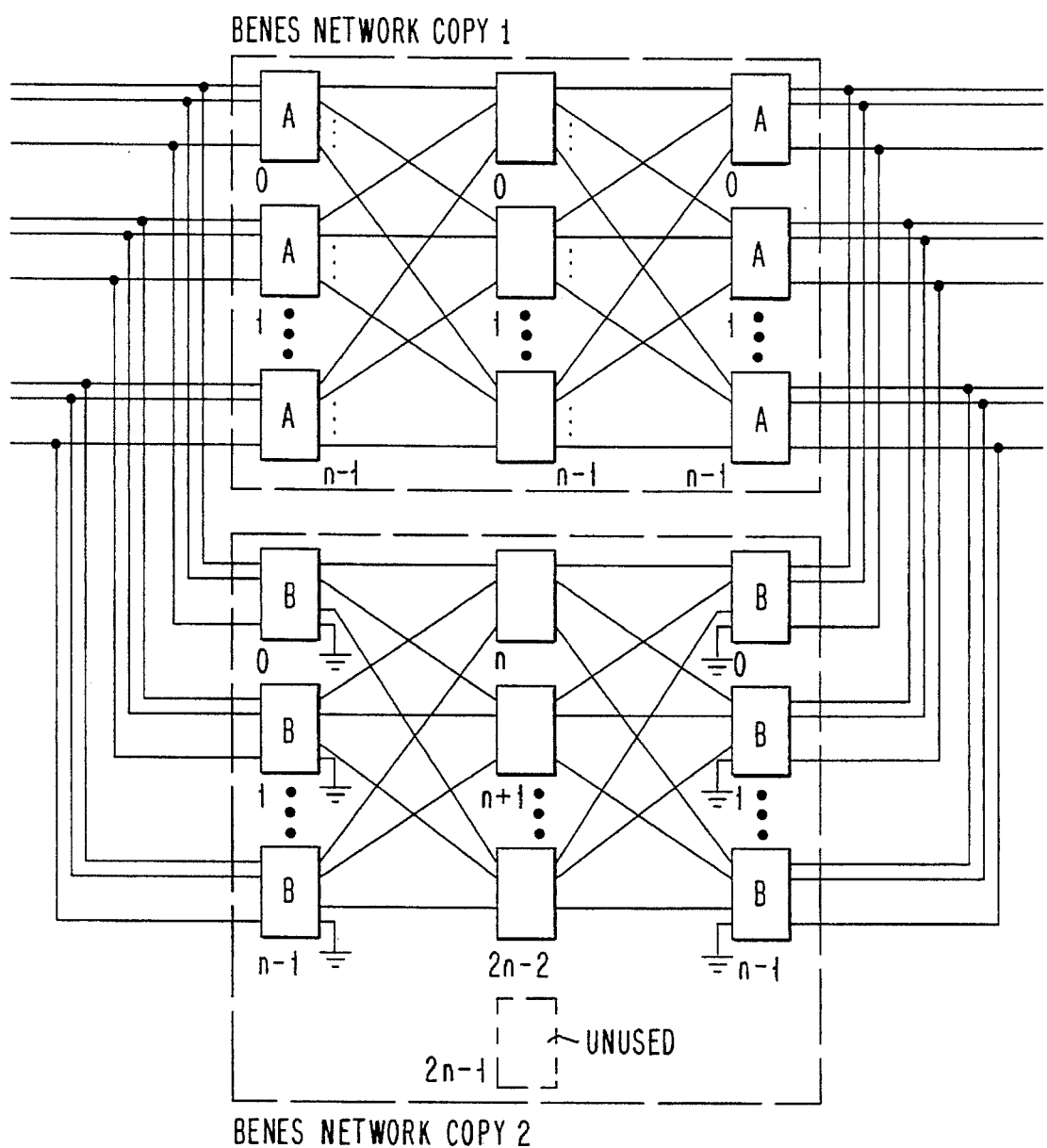
FIG. 4 shows a redrawn version of the network of FIG. 3.

In FIG. 4, the network of FIG. 3 is redrawn collecting all the A crossbars in the first and last stages of the switches together at the top of the respective stages, and collecting all the B crossbars together at the bottom of the respective stages. The top and bottom half of FIG. 4 constitute two Benes networks with some number of network inputs and outputs which are connected together.

Thus, as shown in FIGS. 3 and 4, a Clos network can be seen as two separate Benes networks with common inputs and outputs, with the last switch in the middle stage of the second Benes network being left unused. Therefore, the operation of a Clos network in moving one set of data from the inputs to the outputs can be simulated by making two passes over a Benes network.

In the next section, I first describe a sequential algorithm for determining the switch settings of a Clos network. Then, I describe a parallel algorithm for determining the Clos network switch settings. Then I describe how the switch settings for the two passes of the Benes network are calculated from the switch settings of the Clos network.

The parallel algorithm to determine the switch settings of the Clos network, and the algorithm for deriving the switch settings of the Benes network from it, are implemented in the Pascal program listed in Appendix A. These algorithms are in procedure set_clos_net (lines 35 to 95 of the program) and procedure set_benes_net (lines 98 to 132 of the program). The main program beginning at line 182 first invokes procedure permute, which generates a random permutation between the inputs and outputs of the network. This permutation is stored in the array perm_spec. The procedure permute, and the procedure random used by it, are well-known and understood by those skilled in the art, and are not discussed further.

After invoking the procedure permute, the main program calls the procedures set_clos_net, and set_benes_net, which are described in detail later.

Sequential algorithm for setting up a Clos network.

Suppose input i of the Clos network is to be connected to the output o, and that i belongs to the first stage switch A and that o belongs to the third stage switch B. Now A can be connected to at most n–1 other middle stage switches, and B can be connected to at most n–1 other middle stage switches (n=√N), leaving at least one middle stage switch not connected to either A or B. This middle stage switch can be used to provide a connection from i to o.

To provide a connection between i and o, requires scanning the state of all middle stage switches to find a switch which is neither connected to A nor to B, selecting that switch and then updating the state of the selected middle stage switch to reflect the new connection. To establish one connection, all the middle stage switches may, in the worst case, have to be scanned. In the sequential method, therefore, all the input-output connection pairs specified by a permutation are handled sequentially.

The Parallel Algorithm for setting up a Clos Network

In one preferred embodiment of the method of the present invention, we use n processors associated with the n switches in the first stage of the Clos network. All the processors scan the middle stage switches in parallel, while ensuring that at any given time no two processors look at the same middle stage switch. When scanning a middle stage switch, each processor determines if that middle stage switch can be used to provide a connection from one of the unconnected inputs in the corresponding first stage switch. If such connection can be established, the state of the middle stage switch is modified to reflect the new connection. After each processor examines all the middle stage switches, all connections from the inputs of the Clos network to the specified outputs will have been established.

The set_clos_net procedure in the Pascal program in the attached appendix A describes in detail the parallel algorithm. The three stage Clos network used in this program has 24 switches of size 24×47 in the first stage, 47 switches of size 24×24 in the second stage, and 24 switches of size 47×24 in the last stage. The data structures used in this program are defined in lines 17 through 29. The switch settings of the network are described by the three arrays switch1, switch2, and switch3, which describe the settings of the switches in the first, second and third stages respectively. Each array has one entry for each switch in its stage, and that entry is itself an array with an entry for each input of that switch. If an input of a switch has a connection routed through it, its entry is set to be the output to which this input is connected. If the input has no connection routed through it, its entry is set to –1.

The permutation to be realized by the Clos network is specified by the array permspec, which has one entry for each network input, each such entry being set to be the output of the network to which that input is connected. inps_used is an array with one entry for each input stage switch, which is initialized to be a null set, and during the execution of the algorithm contains the set of all the inputs of a switch which have already been routed. mss_state is another array, which has one entry for each middle stage switch. This entry is also initialized to be a null set, and during the execution of the algorithm contains the set of all the outputs of the middle stage switch which have a connection routed through them. The procedure set_clos_net, lines 35 through 95 of the program, is used to find the switch settings for the switches in the Clos network. First, in lines 47 through 57, all switches in all stages are initialized to indicate that no connection is routed through any of their inputs. The arrays mss_state and inps_used are initialized next, in lines 59 through 63 of the program, to indicate that all outputs of all middle stage switches are free in the beginning, and that no inputs of the first stage switches have been route through the network. Then all processors go through 47 steps (equal to the number of middle stage switches), shown in lines 66 through 93 of the program, in which the processors access different middle stage switches. At the end of the 47 steps, each processor examines all the 47 middle stage switches. This is enforced by making processor P scan switch [(P+tstep) mod 46] in step tstep. Although in a preferred embodiment of the invention each step set forth in lines 71 to 92 is sequentially performed by the P processors, in a parallel algorithm or in a hardware implementation of the parallel algorithm, each of the 47 steps is performed by the 24 processors in parallel.

Line 71 of the program determines the middle stage switch j(j=(P+tstep)mod 46) that is accessed by a processor P in step tstep, and in lines 73 to 92 of the program each processor finds an input of the first stage switch assigned to it which can be routed through the middle stage switch j. The while loop starting at line 75 scans through each input of the first stage switch, until it finds an input which can be connected to the desired output, or until all inputs have been exhausted. Once again, in a preferred embodiment, the inputs of the first stage switch P are evaluated sequentially to find an input i which can be routed through middle stage switch j, a parallel algorithm or a hardware implementation of the parallel algorithm could evaluate the eligibility of several or all inputs in parallel, and use a priority encoder (or a software implementation of the priority encoder) to select an eligible input.

In line 77, mc is the last stage through which input i of the first stage switch P must be routed. The condition in line 79 determines if input i of first stage switch P can be routed through the middle stage switch j. It essentially requires checking that i has not already been connected, and that the output mc (last stage switch through which the connection must be made) of the middle stage switch j is free. If the input i of a first stage switch can be routed through middle stage switch j in step tstep, the switch settings are updated in lines 85 through 87 to reflect the new connection, and mss_state[j] and inps_used are updated appropriately in lines 81 and 82.

At the end of 2n−1 steps, all inputs in all processors are connected. This can be proved easily by contradiction. If input i of a first stage switch P remains unconnected, then processor P must have scanned at least n middle stage switches, all of which have the desired middle stage switch output position filled in, implying that more than n inputs were mapped to the n outputs of the third stage switch attached to the contested middle stage switch output position.

The communication requirements of this invention are easily described. The data structures switch1, switch2, and inps_used are accessed only locally (switch2 and switch3 are stored in column_major format). The elements of mss_state and switch3 are accessed using compile time determinable processor number j. Note that to access the elements of switch3 the element index mc must be sent to the processor j.

Once the switch settings of the Clos network (shown in FIG. 2) are known, they can be mapped into switch setting for two copies of the Benes network (shown in FIG. 4), or be used by a Benes network in two consecutive transfers (passes).

The procedure set_benes_net in the Pascal program of Appendix A accomplishes the above mapping. In the program, the Clos network had 24 switches of size 24×47 in the first stage, 47 switches of size 24×24 in the second stage, and 24 switches of size 47×24 in the third stage. The Benes network which will simulate the function of the Clos network has 24 switches of size 24×24 in all three stages. In general, the Clos network can have n switches of size (2n−1) in the first stage, (2n−1) switches of size n×n in the second stage, and n switches of size (2n−1) in the third stage. The Benes network which will simulate the function of this Clos network will have n switches of size n×n in all three stages. More generally, the Clos network can have m switches of size n×(2n−1) in the first stage, (2n−1) switches of size m×m in the second stage, and m switches of size (2n−1)×n in the third stage. The Benes network which will simulate the function of this Clos network will have m switches of size n×n in the first and third stage, and n switches of size m×m in the middle stage.

The data structures BSS_P1 and BSS_P2 in lines 101 and 102 describe the switch settings for the two transfers over a Benes network (or two copies of the Benes network, each doing one transfer). Each is a two dimensional array, the first dimension indexing to the stages of the network, and the second dimension indexing the switch in the stage. Each entry in this array is itself an array, with an entry for each input of the corresponding switch. If an input of the switch has a connection routed through it, then its entry is the output to which this input is connected. If an input has no connection routed through it, the entry is set to −1.

The first transfer over the Benes network routes connections which are routed through the first 24 middle stage switches in the Clos network, and the second transfer routes connections which are routed through the last 23 middle stage switches in the Clos network. Lines 117 through 123 calculate the switch settings for the middle stage of the Benes network. For the first transfer over the Benes network, the switch settings of the 24 middle stage switches are identical to those of the first 24 middle stage switches of the Clos network, and are set in line 119. For the second transfer, the switch settings of the first 23 middle stage switches in the Benes network are the same as those of the last 23 switches (numbered 24 through 46) in the middle stage of the Clos network, and are set in line 121. The last switch of the middle stage is not used in the second transfer, and is set accordingly in line 122.

Lines 106 to 115 calculate the switch setting for the first stage of the Benes network. For each input i of all first stage switches in the Clos network, line 108 checks whether it uses the first 24 switches of the middle stage in the Clos network, or the last 23, and in the former case, the input is routed in the first transfer over the Benes network as shown in lines 109 and 110, and in the latter case, it is routed in the second pass as shown in lines 113 and 114. In the second transfer over the Benes network, the middle stage switches 24 through 46 of the Clos network map into switches 0 through 23 of the Benes network, and the outputs 24 through 46 of the first stage switches in the Clos network map to outputs 0 through 23 of the first stage switches of the Benes network. Therefore, as shown in line 114, the connection from first stage switch i input j, in the Benes network in the second transfer is obtained by subtracting 24 from the corresponding connection in the Clos network.

Lines 125 to 131 calculate the switch settings for the last stage of the Benes network. The connections going through the first 24 inputs of the last stage switches in the Clos network are mapped to the corresponding inputs of the last stage switches of the Benes network in the first transfer. This is accomplished in line 127. The connections going through the inputs 24 through 46 of the last stage switches in the Clos network are mapped to inputs 0 through 22 of the last stage switches of the Benes network in the second transfer. This is accomplished in line 129 of the program of Appendix A. The last input of all last stage switches is not used in the second transfer over the Benes network, and is set accordingly in line 130.

Variations

In the current implementation, in each step the processors scan the inps_used list sequentially. This implementation is preferred for GF11 where the scan can be completed in 50 cycles. However, we can equally well choose an alternative way to represent the mss_state, inps_used, switch'x' data structures and an alternative way for doing the scan in parallel using multiple processors.

Furthermore, in this embodiment, the switches in all three stages of the Benes network are of size n×n with n switches in each stage. However, those skilled in the art will readily observe that the invention can be extended easily to Benes networks having m switches of size n×n in the first and last stage and n switches of size m×m in the middle stage.

APPENDIX A

```
/************************************************************/
/*                                                          */
/* Algorithm to simulate Clos network operation on Benes network, so */
/* that the setup time can be reduced substantially at the cost of   */
/* one extra pass over the network for realizing one permutation.    */
/*                                                          */
/*                                                          */
/*                                                          */
/************************************************************/
program tass4 ;

type
    PERM576 = array [0..575] of 0..575 ;
    SET24 = packed set of 0..23 ;

def rand : integer ;
    permspec : PERM576 ;     /* Permutation to be established       */ mss_state : array [0..46] of SET24 ;   /* State of middle stage
                                                        switches */
    inps_used : array [0..23] of SET24 ;   /* Inputs of first stage
                                              already connected */

/* Setting for the CLOS
                                              network switches      */
    switch1 : array [0..23] of array [0..23] of -1..46 ;
    switch2 : array [0..46] of array [0..23] of -1..23 ;
    switch3 : array [0..23] of array [0..47] of -1..23 ;

value
    rand := 271828 ;

procedure set_clos_net ;

/************************************************************/
/* This is the CORE of the proposed algorithm.  Here switch settings */
/* are determined using the mss_state and inps_used arrays.          */
/************************************************************/ var    i, j, k, P, mc, tstep : integer ;
       found : boolean ;

begin for i := 0 to 23 do begin       /* Initialize the switch settings*/
        for j := 0 to 23 do begin
            switch1[i,j] := -1 ;
            switch2[i,j] := -1 ;
            switch3[i,j] := -1 ;
        end ;
        for j := 0 to 22 do begin
            switch2[j+24,i] := -1 ;
            switch3[i,j+24] := -1 ;
        end ;
    end ;
```

```
     for i := 0 to 46 do
        mss_state[i] := [] ;

for i := 0 to 23 do
        inps_used[i] := [] ;

for tstep := 0 to 46 do           /* steps to examine different
                                          middle stage switches      */ for P := 0 to 23 do begin      /* The parallel loop for diff.
                                          first stage switches/procs. */
           j := (tstep+P) mod 46 ;

i := 0 ;    found := FALSE ;
                                                   /* Find an input*/
           while ( (i < 24) & (¬found) ) do begin  /* i which uses */
                                                   /* middle stage */
              mc := permspec[P*24+i] div 24 ;      /* switch j     */ if ( ¬(i in inps_used[P]) & ¬(mc in mss_state[j]) ) then
              begin
                 inps_used[P] := inps_used[P] + [i] ;
                 mss_state[j] := mss_state[j] + [mc] ;
                 found := TRUE ;

switch1 [P, i] := j ;
                 switch2 [j, P] := mc ;
                 switch3 [mc, j] := permspec[P*24+i] mod 24 ;
              end else
                 i := i + 1 ;
           end ;
        end ;      /* for P loop */ end ;

procedure set_benes_net ;
var
   i, j : integer ;
   BSS_P1 : array [0..2, 0..23] of array [0..23] of -1..23 ;
   BSS_P2 : array [0..2, 0..23] of array [0..23] of -1..23 ;

begin for i := 0 to 23 do
      for j := 0 to 23 do
         if ( switch1[i,j] < 24 ) then begin
            BSS_P1[0,i,j] := switch1[i,j] ;
            BSS_P2[0,i,j] := -1 ;
         end
         else begin
            BSS_P1[0,i,j] := -1 ;
            BSS_P2[0,i,j] := switch1[i,j] - 24 ;
```

```
              end ;

for j := 0 to 23 do begin
        for i := 0 to 23 do
            BSS_P1[1,i,j] := switch2[i,j] ;
        for i := 24 to 46 do
            BSS_P2[1,i-24,j] := switch2[i,j] ;
        BSS_P2[1,23,j] := -1 ;
    end ;

for i := 0 to 23 do begin
        for j := 0 to 23 do
            BSS_P1[2,i,j] := switch3[i,j] ;
        for j := 24 to 46 do
            BSS_P2[2,i,j-24] := switch3[i,j] ;
        BSS_P2[2,i,23] := -1 ;
    end ;
end ;

function random(var rand : integer ) : real ;

/**********************************************************************/
/* Plain old Random Number Generator.  Provides uniform distribution  */
/* between 0 and 1.                                                    */
/**********************************************************************/
const
    multiplier = 314159269 ;        incrememt  = 453806245 ;
    mulhi = 314159269 div 32768 ;   mulow = 314159269 mod 32768 ;
    inchi = 453806245 div 32768 ;   inclo = 453806245 mod 32768 ;
var
    randlo, randhi : 0..131071 ;
    hi, lo, comhi : integer ;
begin
    randhi := rand div 32768 ;       randlo := rand mod 32768 ;
    randhi := (randhi mod 2) * 32768 + randhi ;
    hi := ((mulhi * randlo + mulow * randhi + inchi) mod 65536) * 32768;
    lo := mulow * randlo + inclo ;
    comhi := 2147483647 - hi ;
    if ( lo > comhi ) then
        rand := lo - comhi - 1
    else
        rand := lo + hi ;
    random := rand / 2147483647 ;
end ;

procedure permute ;

/**********************************************************************/
/* Sets up an initial Permutation.  The output of this routine is the */
/* array permspec, specifying the permutation to be realized          */
/**********************************************************************/
    var i, j, si, holdindex : integer ;
begin
    for i := 0 to 575 do
        permspec[i] := i ;
```

```
172
173         for i := 575 downto 1 do begin
174             si := trunc ( random(rand) * i ) ;
175             holdindex    := permspec[si] ;
176             permspec[si] := permspec[i] ;
177             permspec[i]  := holdindex ;
178         end ;
179   end ;
180
181
182   begin
183           permute ;              /* Define the permutation to be performed */
184           set_clos_net ;         /* Calculate the switch settings          */
185           set_benes_net ;
186   end.
```

I claim:

1. A method for routing signals through a Benes network having N inputs, N outputs and first, middle and last stages of switches, comprising:

determining a Clos configuration for routing the signals through a Clos network having N inputs, N outputs and first, middle and last stages of switches;

choosing a first Benes configuration for the switches of the middle stage of the Benes network to be the same as the Clos configuration of the switches in a first half of the middle stage of the Clos network, and choosing a second Benes configuration for the switches of the middle stage of the Benes network to be the same as the Clos configuration of the switches in a second half of the middle stage of the Clos network;

operating the Benes network in a two way time division multiplexed manner using the first Benes configuration to send a first portion of the signals during a first period and using the second Benes configuration to send a second portion of the signals during a second period.

2. (amended) The method of claim 1, wherein if the Benes network is a three stage network having N inputs and N outputs with m switches having n inputs and n outputs in the first and last stages, and n switches of having m inputs and m outputs in the middle stage, where n=√N, then the Clos network appears as a three stage network having N inputs and N outputs with m switches having n inputs and (2n−1) outputs in the first stage, (2n−1) switches having n inputs and n outputs in the middle stage, and m switches having (2n−1) inputs and n outputs in the last stage.

3. A method for routing signals through a 2k+1 stage Benes network having N inputs, N outputs and 2k−1 middle stages, where k>=1, the Benes network having m switches each having n inputs and n outputs in the first and last stages thereof, the method comprising the steps of:

a) determining a configuration for routing the signals through a three stage Clos network, the Clos network having m switches each having n inputs and (2n−1) outputs in a first Clos stage, (2n−1) switches each having m inputs and m outputs in a middle Clos stage, and m switches each having (2n−1) inputs and n outputs in a last Clos stage;

b) if k>1 then (i) partitioning the 2k−1 middle stages of the Benes network into n subnetworks, each subnetwork being a 2k−1 stage Benes network having m inputs and m outputs connected to each switch in the first and last stage of the 2k+1 stage Benes network;

(ii) choosing a first and second set of configurations for the n subnetworks in the 2k−1 middle stages to be the configuration of the switches in first and second portions, respectively, of the middle Clos stage of the Clos network by recursively applying the steps of this claim, c) If k=1 then choosing a first and second configuration of the switches of the middle stage of the Benes network to be the configuration of the switches in first and second portions, respectively, of the middle stage switches of the Clos network;

d) operating the Benes network in a $2^k$ way time division multiplexed manner using the $2^k$ configurations obtained in steps b) and c) for the middle stages of the Benes network.

4. A method of claim 3, wherein the first and second configurations are implemented on two copies of the Benes network, the two copies having common network inputs and outputs.

5. A method for configuring switch settings for a three stage Clos network having first, middle and last stages of switches, the method comprising the steps of:

a) classifying the middle stage switches into middle stage sets;

b) classifying the first stage switches into first stage sets;

c) simultaneously attempting to route the respective inputs of at least two first stage sets through different sets of middle stage switches, d) repeatedly performing steps b) and c), using different sets of input stage switches, with each input stage switch using a middle stage set not previously used by that input stage set in preceding iterations to route inputs not routed in preceding steps, until all inputs of all input stage switches are routed.

* * * * *